US009077952B2

(12) United States Patent
Brodersen et al.

(10) Patent No.: US 9,077,952 B2
(45) Date of Patent: *Jul. 7, 2015

(54) TRANSPORT CONTROLS FOR A MEDIA DEVICE

(75) Inventors: Rainer Brodersen, San Jose, CA (US); Jeffrey Robbin, Los Altos, CA (US); Thomas Michael Madden, Sunnyvale, CA (US); Rachel Clare Goldeen, Mountain View, CA (US); Jeffrey Ma, Redwood City, CA (US); Kevin Arnold, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 505 days.

This patent is subject to a terminal disclaimer.

(21) Appl. No.: 13/450,745

(22) Filed: Apr. 19, 2012

(65) Prior Publication Data

US 2012/0207444 A1    Aug. 16, 2012

Related U.S. Application Data

(63) Continuation of application No. 11/621,053, filed on Jan. 8, 2007, now Pat. No. 8,184,943.

(51) Int. Cl.
*H04N 5/765* (2006.01)
*H04N 9/80* (2006.01)
*G06F 3/041* (2006.01)
*G06F 15/16* (2006.01)
*H04N 5/783* (2006.01)
*G11B 19/02* (2006.01)
*G11B 27/00* (2006.01)
*G11B 27/34* (2006.01)

(Continued)

(52) U.S. Cl.
CPC ............. *H04N 5/783* (2013.01); *G11B 19/025* (2013.01); *G11B 27/005* (2013.01); *G11B 27/34* (2013.01); *H04N 5/765* (2013.01); *H04N 5/781* (2013.01); *H04N 5/907* (2013.01); *H04N 5/915* (2013.01)

(58) Field of Classification Search
CPC .......... H04N 5/765; G06F 3/041; G06F 15/16
USPC ............ 386/234, E5.001, 239, 249; 345/173, 345/619; 707/E17.028; 709/217; 358/908
See application file for complete search history.

(56) References Cited

U.S. PATENT DOCUMENTS 4,939,601 A    7/1990  Endo et al.
5,911,029 A *  6/1999  Sakaguchi et al. ............ 386/239
(Continued)

FOREIGN PATENT DOCUMENTS

EP    1439540 A1    7/2004
GB    2234105 A     1/1991

OTHER PUBLICATIONS

U.S. Non-Final Office Action for U.S. Appl. No. 11/621,053 dated Dec. 10, 2010, 12 pages.
(Continued)

*Primary Examiner* — Thai Tran
*Assistant Examiner* — Syed Hasan
(74) *Attorney, Agent, or Firm* — Morgan, Lewis & Bockius LLP (57) ABSTRACT

A method of scanning content comprises receiving an input signal indicating that content being displayed is to be scanned, sensing a duration of the received input signal, and scanning the content at a rate based at least in part on the sensed duration of the received input.

20 Claims, 7 Drawing Sheets (51) Int. Cl.
    *H04N 5/781*     (2006.01)
    *H04N 5/907*     (2006.01)
    *H04N 5/915*     (2006.01)

(56) References Cited

U.S. PATENT DOCUMENTS

| | | | |
|---|---|---|---|
| 6,331,859 B1 * | 12/2001 | Crinon | 345/619 |
| 6,360,053 B1 | 3/2002 | Wood et al. | |
| 6,943,778 B1 * | 9/2005 | Astala et al. | 345/173 |
| 2004/0156624 A1 | 8/2004 | Kent et al. | |
| 2005/0134306 A1 | 6/2005 | Stojanovic et al. | |
| 2005/0163477 A1 | 7/2005 | Kendall | |
| 2005/0166230 A1 | 7/2005 | Gaydou et al. | |
| 2006/0062549 A1 | 3/2006 | Jun et al. | |
| 2006/0284857 A1 * | 12/2006 | Oh | 345/173 |
| 2007/0081587 A1 | 4/2007 | Raveendran et al. | |
| 2007/0136679 A1 | 6/2007 | Yang | |

OTHER PUBLICATIONS

U.S. Final Office Action for U.S. Appl. No. 11/621,053 dated May 27, 2011, 16 pages.
U.S. Non-Final Office Action for U.S. Appl. No. 11/621,053 dated Aug. 18, 2011, 15 pages.
U.S. Notice of Allowance for U.S. Appl. No. 11/621,053 dated Feb. 7, 2012, 10 pages.
International Search Report and Written Opinion, dated May 6, 2008, received in International Patent Application No. PCT/US2008/050535, which corresponds with U.S. Appl. No. 11/621,053, 8 pages.
International Preliminary Report on Patentability, dated Jul. 14, 2009, received in International Patent Application No. PCT/US2008/050535, which corresponds with U.S. Appl. No. 11/621,053, 6 pages.

\* cited by examiner

TRANSPORT CONTROLS FOR A MEDIA DEVICE

CROSS-REFERENCE TO RELATED APPLICATION

This application is a continuation (and claims the benefit of priority under 35 USC 120) of U.S. application Ser. No. 11/621,053, filed Jan. 8, 2007, now allowed. The disclosure of the prior application is considered part of (and is incorporated by reference in) the disclosure of this application.

TECHNICAL FIELD

In general, this document describes manipulating a media processing device to control the presentation of content.

BACKGROUND

Media processing devices embedded with media applications capable of playing audio and visual content enhance user experience. The content can include music, video, photographs, and the like. Such media processing devices can be configured to play either a single type of content. For example, certain DVD players can play back only video content stored on a DVD. Other devices can be configured to play a plurality of content including audio, video, images, and the like. For example, the iPod, manufactured by Apple Computers of Cupertino, Calif., can play audio and video content.

The content played on media processing devices can be manipulated based on user input. For example, in media processing devices capable of playing a plurality of content types, users can choose to play audio content, stop the audio content, and switch to video content. While playing video content, users can manipulate the presentation state of the content. The presentation state can include play, stop, pause, forward, rewind, and the like. Often, media processing devices are configured to present users with an interface through which users can provide input to manipulate the content. Users can interact with the interface through devices including either wired and wireless remote control devices.

SUMMARY

The present inventors recognized that the ability to control a media processing device to manipulate the state of content presented on a display device using as few interactions with a remote control device as necessary is desirable to users.

In one aspect, a method of scanning content is described. The method can include receiving an input signal indicating that content being played is to be scanned, sensing a duration of the received input signal, and scanning the content at a rate based at least in part on the sensed duration of the received input.

This and other aspects can include one or more of the following features. The scanning can include moving a playhead position in an accelerated manner from a current location in the content to a different location in the content. The content can include digital media content. The input can be received by pressing a button on a remote control device and the duration of the input can correspond to a duration for which a button on the remote control device is pressed. The content can be played at a play frame rate and the play frame rate can be increased to a first frame rate when the duration of the input exceeds a first threshold. The play frame rate can be increased to a second frame rate when the duration of the input exceeds a second threshold, wherein the second frame rate is greater than the first frame rate and the second threshold is greater than the second threshold. The method can further include sensing a cessation of input signal, wherein the rate is returned to the play frame rate upon sensing the cessation. The input signal can be provided by clicking a button on the remote control device. The content can be divided into a plurality of segments, wherein each segment can include one or more frames, and a number of frames in each segment can depend on a time length of the content. Each segment can be referenced by a frame in the segment. Upon sensing the clicking, a playhead corresponding to a location of a frame in a segment being displayed can be moved to a first frame of a subsequent segment. The content can be scanned either in a forward or a backward direction.

In another aspect, a system for scanning content is described. The system can be configured to receive an input signal indicating that content being played is to be scanned, sense a duration of the received input signal, and scan the content at a rate based at least in part on the sensed duration of the received input.

This and other aspects can include one or more of the following features. The system can be configured to scan the content can be further configured to move a playhead position in an accelerated manner from a current location in the content to a different location in the content. The content can include digital media content. The system can be further configured to receive input by pressing a button on a remote control device, the duration of the input corresponding to a duration for which a button on the remote control device is pressed. The system can be further configured to play the content at a play frame rate, and increase the play frame rate to a first frame rate when the duration of the input exceeds a first threshold. The system can be further configured to increase the play frame rate to a second frame rate when the duration of the input exceeds a second threshold, wherein the second frame rate is greater than the first frame rate and the second threshold is greater than the first threshold. The system can be further configured to sense a cessation of input signal, wherein the rate is returned to the play frame rate upon sensing the cessation. The input signal can be provided by clicking a button on the remote control device. The system can be further configured to divide the content into a plurality of segments, wherein each segment can include one or more frames, and a number of frames in each segment can depend on a time length of the content. Each segment can be referenced by a frame in the segment. The system can be further configured to move a playhead corresponding to a location of a frame in a segment being displayed to a first frame of a subsequent segment, upon sensing the clicking. The system can be further configured to scan the content in either a forward or a backward direction.

In one example, the system and techniques described here can present content on a display device, manipulate the state of the content on the display device in response to user input, wherein the user input can be received from a wireless remote control device. The system and techniques described here may present one or more of the following advantages. First, using a wireless remote control device allows users to control the media processing device without being physically present adjacent to the media processing device. Moreover, using the same wireless remote control device, users can perform multiple operations on the content including play, stop, pause, forward, rewind, and the like. Further, during forward and rewind operations, users can alter the rate at which content is scanned using the remote control device to reach desired viewing points faster. Still further, during pause operations, users can step through content to enhance the viewing experience.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
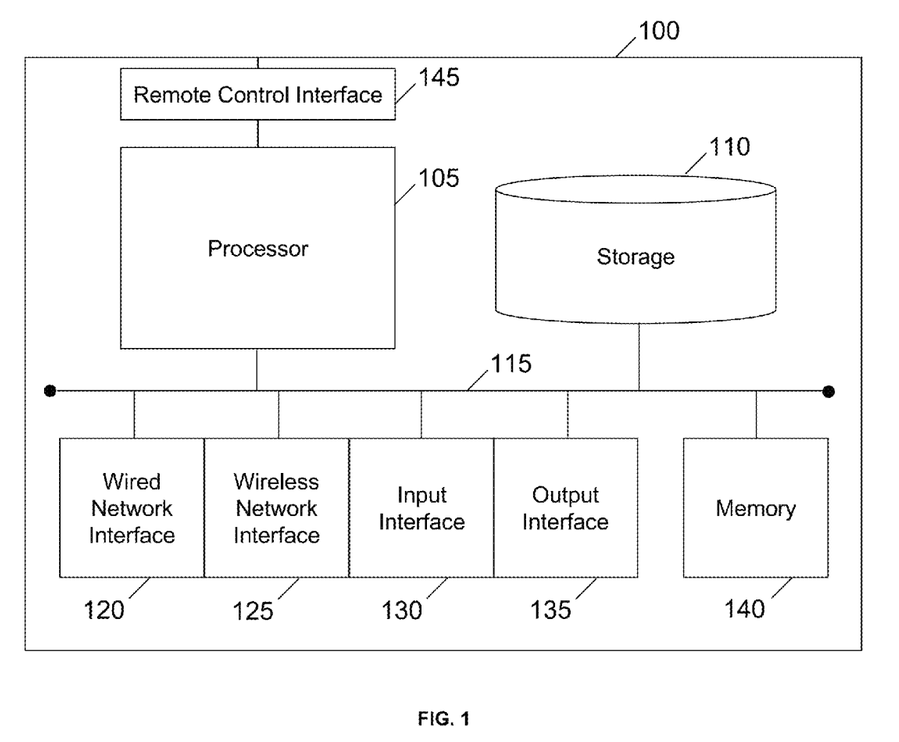
FIG. 1 is an example of a media client.

FIG. 1 presents a media client 100 that can be configured to present one or more types of media through a presentation device, including audio, video, images, or any combination thereof. The media client 100 includes a processor 105 configured to control the operation of the media client 100. For example, the processor 105 can control communications with one or more media servers to receive media for playback. The media can be received through push and/or pull operations, including through downloading and streaming. The processor 105 also can be configured to generate output signals for presentation, such as one or more streams representing media content or an interface for interacting with a user.

The media client 100 also includes a storage device 110 that can be configured to store information including media, configuration data, and operating instructions. The storage device 110 can be any type of non-volatile storage, including a hard disk device or a solid-state drive. For example, media received from an external media server can be stored on the storage device 110. The received media thus can be locally accessed and processed. Further, configuration information, such as the resolution of a coupled display device or information identifying an associated media server, can be stored on the storage device 110. Additionally, the storage device 110 can include one or more sets of operating instructions that can be executed by the processor 105 to control operation of the media client 100. In an implementation, the storage device 110 further can be divided into a plurality of partitions, wherein each partition can be utilized to store one or more types of information. Additionally, each partition can have one or more access control provisions.

A communication bus 115 couples the processor 105 to the other components and interfaces included in the media client 100. The communication bus 115 can be configured to permit unidirectional and/or bidirectional communication between the components and interfaces. For example, the processor 105 can retrieve information from and transmit information to the storage device 110 over the communication bus 115. In an implementation, the communication bus 115 can be comprised of a plurality of busses, each of which couples at least one component or interface of the media client 100 with another component or interface.

The media client 100 also includes a plurality of input and output interfaces for communicating with other devices, including media servers and presentation devices. A wired network interface 120 and a wireless network interface 125 each can be configured to permit the media client 100 to transmit and receive information over a network, such as a local area network (LAN) or the Internet. Additionally, an input interface 130 can be configured to receive input from another device through a direct connection, such as a USB or an IEEE 1394 connection.

Further, an output interface 135 can be configured to couple the media client 100 to one or more external devices, including a television, a monitor, an audio receiver, and one or more speakers. For example, the output interface 135 can include one or more of an optical audio interface, an RCA connector interface, a component video interface, and a High-Definition Multimedia Interface (HDMI). The output interface 135 also can be configured to provide one signal, such as an audio stream, to a first device and another signal, such as a video stream, to a second device. Further, a non-volatile memory 140, such as a read-only memory (ROM) also can be included in the media client 100. The non-volatile memory 140 can be used to store configuration data, additional instructions, such as one or more operating instructions, and values, such as one or more flags and counters. In an implementation, a random access memory (RAM) also can be included in the media client 100.

Additionally, the media client 100 can include a remote control interface 145 that can be configured to receive commands from one or more remote control devices (not pictured). The remote control interface 145 can receive the commands through wireless signals, such as infrared and radio frequency signals. The received commands can be utilized, such as by the processor 105, to control media playback or to configure the media client 100. In an implementation, the media client 100 can be configured to receive commands from a user through a touch screen interface. The media client 100 also can be configured to receive commands through one or more other input devices, including a keyboard, a keypad, a touch pad, a voice command system, and a mouse.

Figure 2:
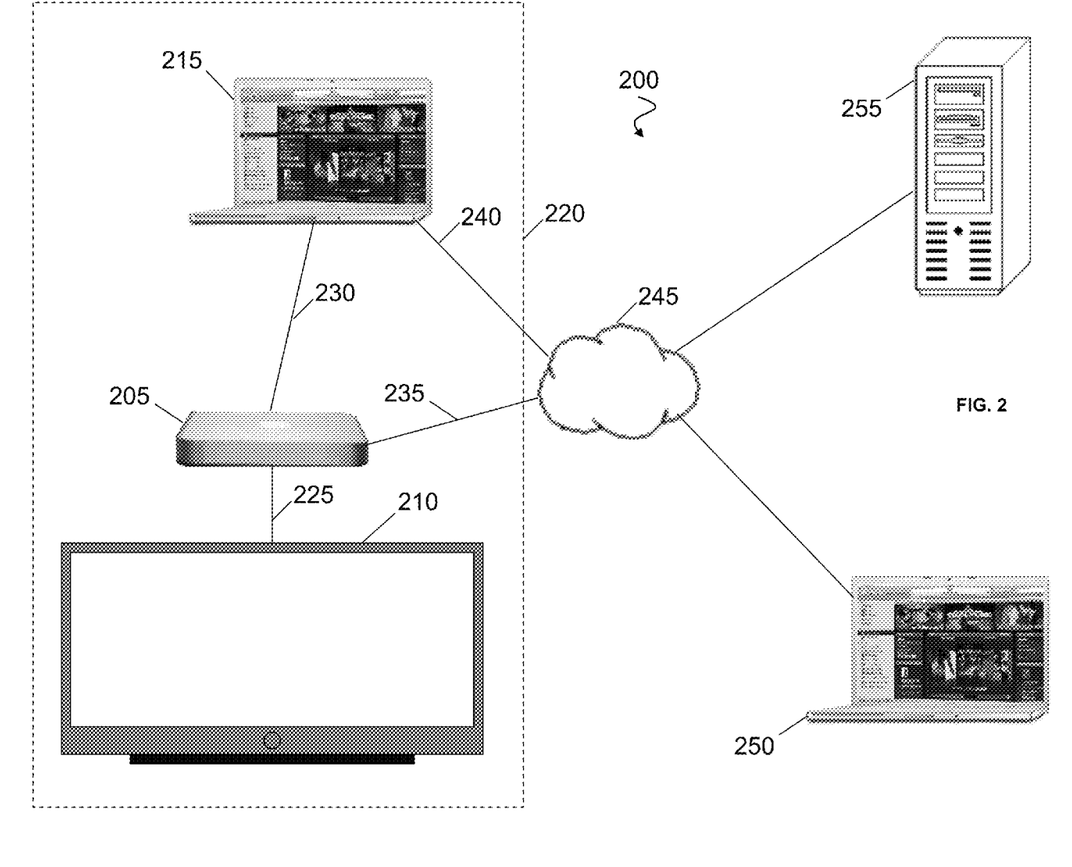
FIG. 2 is an example of a media system including a media client.

FIG. 2 presents a media system 200 that includes a media client 205. The media system 200 includes a host location 220, such as a home or office, in which the media client 205 is installed. The host location 220 also can include a local media server 215 and a presentation device, such as a monitor 210. The monitor 210 can be coupled to the media client 205 through a media connector 225, such that video and/or audio information output by the media client 205 can be presented through the monitor 210. Further, the media client 205 can be coupled to the local media server 215 through a local connection 230, such as a wired network connection, a wireless network connection, or a direct connection. As such, the media client 205 can receive media content from the local media server 215. The local media server 215 can be any computing device, including a personal computer, a server, a palm top computer, or a media device capable of storing and/or playing back media content.

Further, the media client 205 and the local media server 215 can include network connections 235 and 240 respectively, which provide access to a network 245, such as the Internet. In an implementation, the media client 205 can communicate with a remote media server 250 and/or a media store 255 over the network 245. For example, a connection can be established between the media client 205 and the remote media server 250. The connection can be secure or unsecure. Thereafter, the media client 205 can receive media content from the remote media server 250, such as by streaming or downloading.

Similarly, the media client 205 can be configured to receive media content from a media store 255. For example, upon establishing a connection, the media client 205 can request a list of available media content from the media store 255. The list of available media content can include free content, such as trailers and pod casts, and for-purchase content, such as movies, television programs, and music. Additionally, the media client 205 can be configured to communicate with the media store 255 to validate media content, such as by verifying digital rights management information.

Media content can be transferred from any remote server, such as the remote media server 250 or the media store 255, via one or more transmission protocols, including Hyper Text Transfer Protocol (HTTP). For example, the media client 100 can request media content from a remote media server 250. In response, the remote media server 250 can transmit the requested media content to the media client 100 using HTTP. The media content can be transferred using a plurality of data packets, which are separately transmitted over the network 245. Further, by utilizing HTTP version 1.1, the media client 100 can transmit a plurality of requests for media content to the media server. The plurality of requests can be transmitted simultaneously or close in time, such that a request for media content is not delayed until a response to a previous request is received. As a result, latency in the transfer of requested media content can be reduced. Additionally, by utilizing HTTP version 1.1, one or more byte ranges can be identified to request specific portions of media content.

Figure 3:
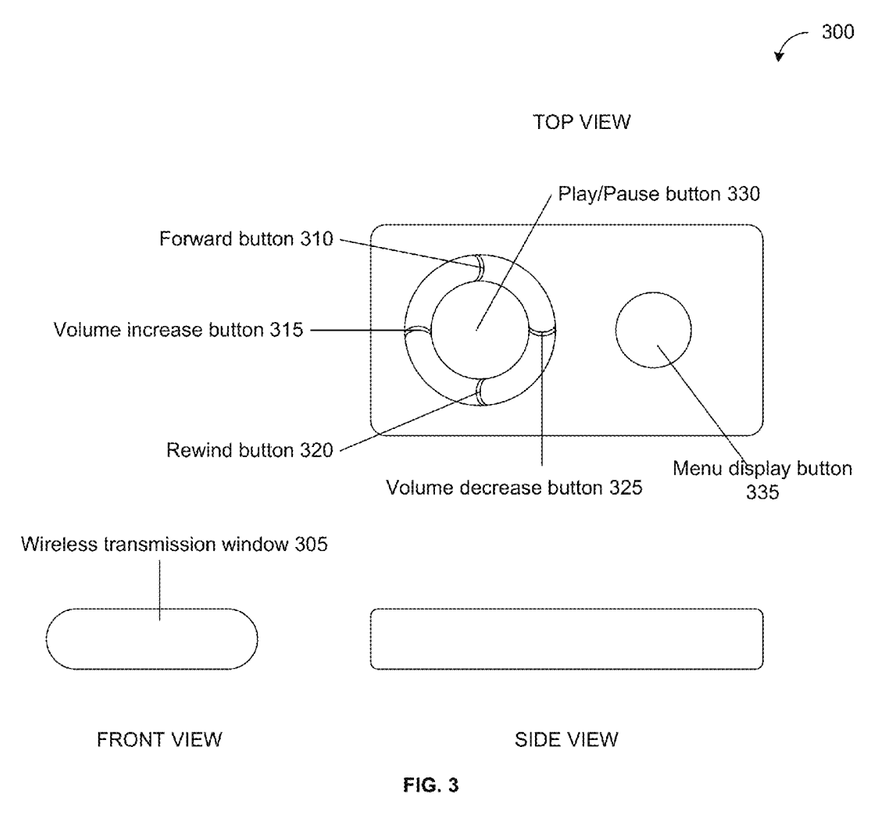
FIG. 3 is an example of a remote control device.

FIG. 3 depicts an example of a remote control device 300. In some implementations, users can interact, communicate, and manipulate the media client 100 using a remote control device 300. The remote control device 300 is operatively coupled with the media client 100. Input from the remote control device 300 is transferred to the processor 105 in the media client 100 through the remote control interface 145. The processor 105 is configured to perform operations in response to the input received. Some or all of the operations performed in response to the input received can be viewed on the display device.

The remote control device 300 is lightweight, low powered, and highly portable. The remote control device can be held and operated by users using one hand. The remote control device 300 includes a wireless transmission window 305, shown in the front view of the remote control device 300. The remote control device 300 can interact with the media client 100 through wireless signals transmitted through the wireless transmission window 305. In some implementations, the wireless signals can be infrared signals. In other implementations, the wireless signals can be high frequency radio signals.

In some implementations, the remote control device 300 can include buttons on its surface, as shown in the top view in FIG. 3. Users can manipulate the state of the content displayed on the display device by mechanical input to the remote control device 300 including pressing/clicking and/or holding one or more buttons on the remote control device 300 in one or more combinations and/or sequences. Each button on the remote control device 300 can be configured to perform at least one operation in response to user input. In some implementations, buttons 310, 315, 320, 325, 330, and 330 can be configured to perform operations forward, volume increase, rewind, volume decrease, menu display, and play/pause, respectively. In other implementations, the remote control device 300 can be operated using touch-based operations, near-contact operations or combinations thereof. For example, the remote control device 300 can be embedded with a proximity detection mechanism that can sense the presence of an input device, for example, a user's finger, without requiring contact with the surface of the remote control device 300.

The media client 100 can be operatively coupled to a display device to display video content on the display device. The video content can be received from the media server and stored in the storage 110 of the media client 100. Alternatively, the video content can be stored on the media server and streamed from the media server to the media client 100 for display on the display device. In some implementations, the media client 100 can be configured to display the video content on the entire display area available on the display device. In other implementations, the video content can occupy a portion of the area of the display device. The remainder of the area of the display device may either be blank or display additional content. The additional content can include metadata related to the video content and indications corresponding to manipulations of the media client 100. In other implementations, the video content can occupy the entire area of the display device. Upon receiving input, the media client 100 may present overlay content over the video content for display. Upon cessation of input for a pre-determined duration, the overlay content may be hidden from view.

In some implementations, a menu of media items available can be displayed on the display device by clicking the menu display button 335. The buttons 310, 315, 320, 325, and 330, can additionally be configured to perform menu navigation operations. The video content can be chosen from the menu of media items. The video content can be categorized by a menu that can contain further classifications including movies, television, documentaries, and the like. A user can navigate the classifications to arrive at desired video content, e.g., a movie. A user can commence displaying the desired video content on the display device by clicking the play/pause button 330.

Figure 4A:
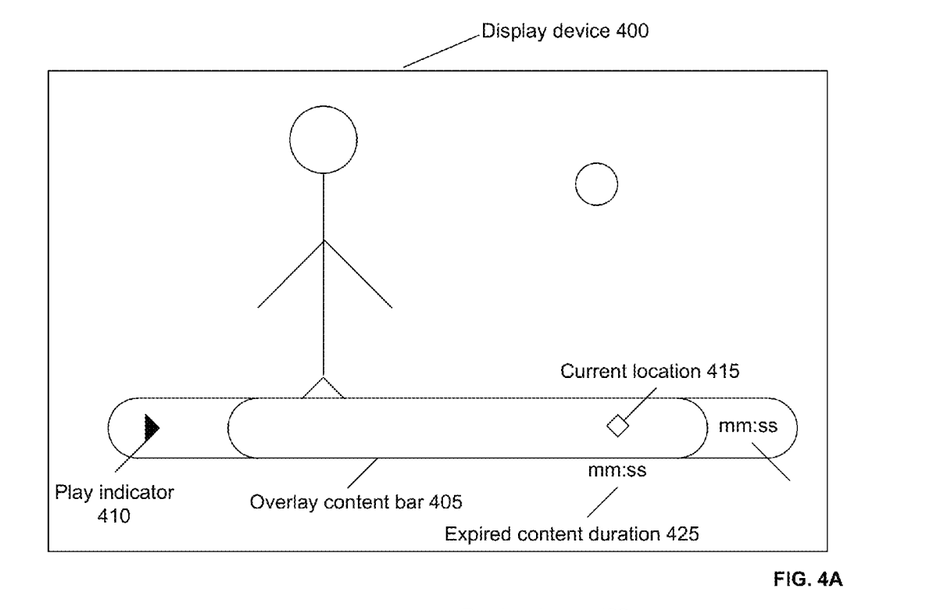
FIG. 4A is an example of video content in a play state.

FIGS. 4A-4D depict schematics of video content being displayed in different states. When the video content is played on the display device 400, the video content can occupy the entire area of the display device, as depicted in FIG. 4A. In some implementations, an overlay content bar 405 is displayed over the video content. The overlay content bar 405 can include a play indicator 410, a current location indicator 415, expired content duration 420, and total content duration 430. In some implementations, the expired content duration 420 and the total content duration 430 can be displayed in minute:second (mm:ss) format. The overlay content bar 405 can be displayed over the video content once the user presses the play/pause button 330 to begin video content display. In the absence of input for a pre-determined duration, the overlay content bar 405 can be hidden. Any interaction by the user with the remote control device 300 may cause the overlay content bar 405 to be reappear over the video content.

The video content can include a plurality of frames, each frame including an image, and the frames can be scanned at a rate to provide a video viewing experience. The rate can be encoded in the video content and accessed by the media client 100. A user may wish to view the video content starting from a frame that is not the first frame. In some implementations, the duration of the video content can be divided into a number of segments. Each segment can represent a fraction of the video content. For example, the duration of the video content can be divided into 20 segments and each segment can represent $\frac{1}{20}^{th}$ of the total duration. Each segment can include a plurality of frames wherein a segment can be referenced by the first frame in the segment. In such implementations, when a segment is played, playing commences from the first frame of the segment.

The media client 100 can be configured such that when the forward button 310 is clicked, a playhead corresponding a location of a frame in a segment being displayed is moved to a first frame of a subsequent segment. The first frame of the subsequent segment can be accessed and displayed on the display device. Thus, when a user wishes to view the video content from a point that is not at the start of the video content, the user can press the forward button 310 to skip segments and arrive at or near the desired viewing location. Each click of the forward button 310 causes the video content to progress forward by one segment. When a segment is displayed on the display device 400, the frame displayed in response to each click of the forward button 310 can be the first frame that references the subsequent segment. When the user ceases clicking the forward button 310, video content is played from the first frame related to that segment. In this manner, a user can alter the viewing location of the video content viewed using the remote control device 300.

A user may wish to proceed to a specific location in the video content in an accelerated manner at a rate faster than the rate at which the video content is played. The rate at which the content is displayed may correspond to a play frame rate, which is a number of frames of the video content displayed on the display device each second. The frame rate can be encoded in the video content and accessed by the media client 100. In some implementations, the user can press and hold the forward button 310 to scan the video content at a faster rate. When the user presses and holds the forward button 310, the media client 100 can increase the frame rate from a play frame rate to a first frame rate. The increase in frame rate can cause the frames in the video content to be skipped. For example, the play frame rate can be 30 frames per second. When the forward button 310 is pressed and held, the frame rate can be increased to a first frame rate that equals 45 frames per second. The first frame rate may cause the media client 100 to skip frames causing the images on the display device to appear discontinuous. The first frame rate corresponds to a first forward speed, namely 1× speed.

Figure 4B:
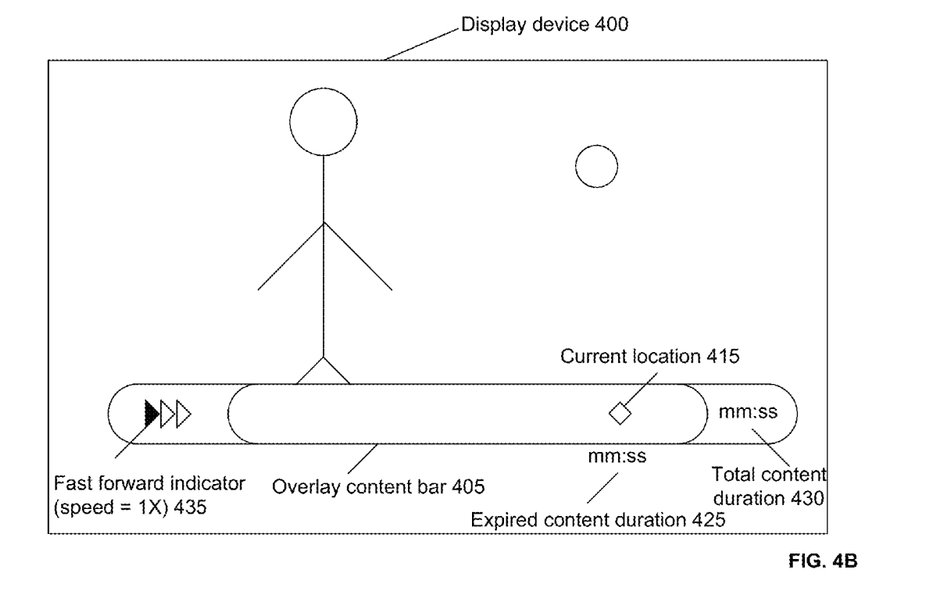
FIG. 4B is an example of video content in a forward state.

In some implementations, when the video content is in a forward state, the overlay content bar 405 can be displayed over the video content, as depicted in FIG. 4B. The play indicator 410 can be replaced with a forward indicator 435. In some implementations, the forward indicator 435 can be displayed as a plurality of triangles placed adjacent to one another. The first triangle can be filled with a color to indicate that the video content is in a forward state and that the frame rate corresponds to 1× speed. In some implementations, the media client 100 can continuously update the expired content duration 425.

Figure 4C:
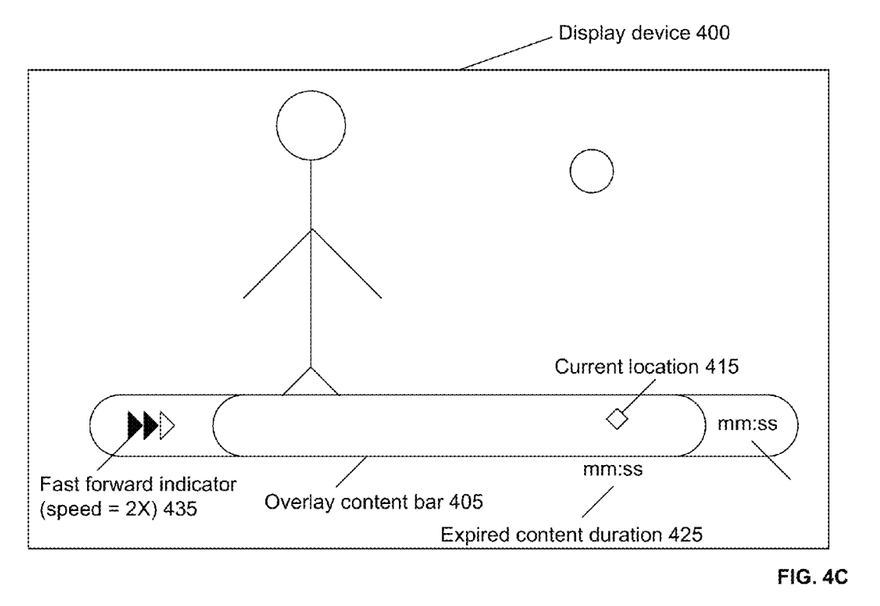
FIG. 4C is an example of video content in a forward state.

In some implementations, if the user continues to press and hold the forward button 310 for a duration that exceeds a first threshold, the media client 100 can increase the frame rate to a second frame rate. In such cases, the second frame rate can correspond to a second speed, namely 2×. Two of the plurality of triangles in the forward indicator 435 can be filled with a color to indicate that the video content is in a forward state and the frame rate corresponds to 2× speed (FIG. 4C). In some implementations, the expired content duration 425 can be continuously updated. In other implementations, the expired content duration 425 can cease to be updated once the frame rate exceeds the first frame rate. Alternatively, the media client 100 can be configured to cease to update the expired content duration 425 until forward button 310 is released.

Figure 4D:
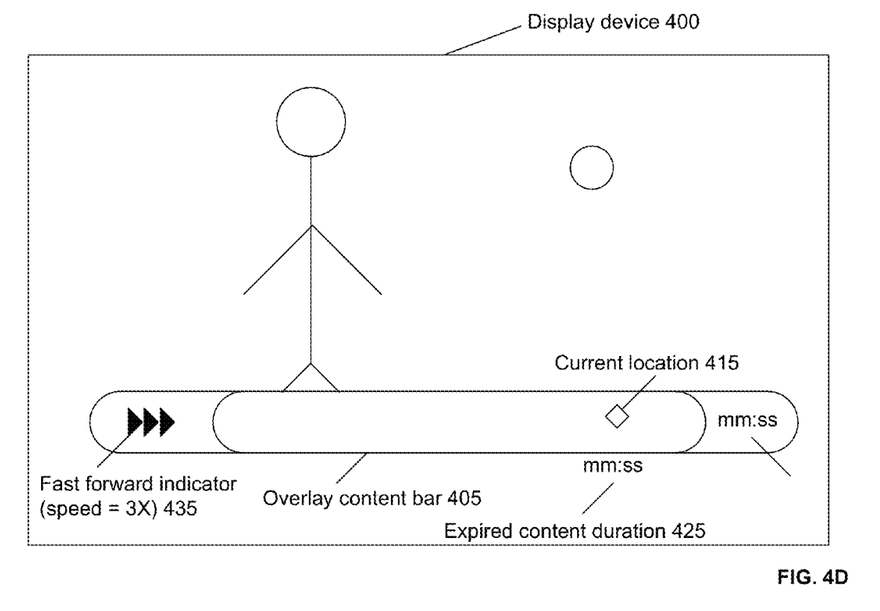
FIG. 4D is an example of video content in a forward state.

When the duration for which the forward button 310 is pressed and held exceeds a second threshold, the media client 100 can increase the frame rate to a third frame rate that corresponds to 3× speed. Three of the plurality of triangles in the forward indicator 435 can be filled with a color to indicate that the video content is in a forward state and the frame rate corresponds to 3× speed (FIG. 4D). In some implementations, the number of triangles in the forward indicator 435 may correspond to the frame rate. For example, when the frame rate corresponds to 2× speed, the forward indicator 435 may include 2 triangles. When the frame rate corresponds to 3× speed, the forward indicator 435 may include 3 triangles, and so on.

In some implementations, when the forward button 310 is released, the frame rate resumes to the play frame rate. In other implementations, when the forward button 310 is released, the video content is continued to scan forward. The user can resume playing the video content by pressing the play/pause button 330.

Figure 5:
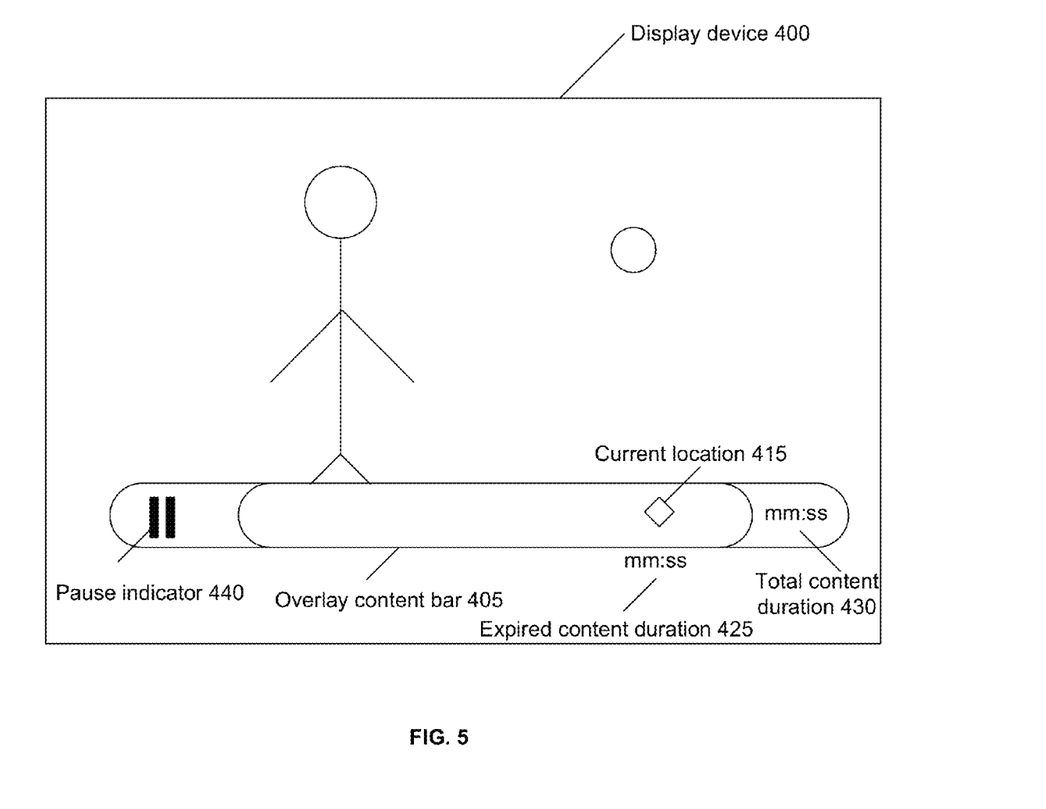
FIG. 5 is an example of video content in a pause state.

In some implementations, the user may wish to pause the video content. The user can pause the video content by pressing the play/pause button 330 when the video content is being played. When the play/pause button 330 is pressed, the overlay content bar 405 is displayed over the video content (FIG. 5). The pause state is indicated by a pause indicator 440. The user can resume playing by pressing the pause/play button 330. The user can scan forward in the pause state by pressing the forward button 310 after the pause state is entered. In some implementations, the video content can scan forward by a fixed number of frames for each click of the forward button 310. In other implementations, the video content can continue to scan forward subsequent to the first click without requiring additional clicks. Subsequently, the video content can return to the pause state when either the forward button 310 or the play/pause button 330 is pressed. Alternatively, the video content can return to a play state when either the forward button 310 or the play/pause button 330 is pressed. In some implementations, the number of frames by which the video content progresses can be fixed. In other implementations, the number of frames by which the video content progresses can be a function of the total duration of the video content.

Figure 6:
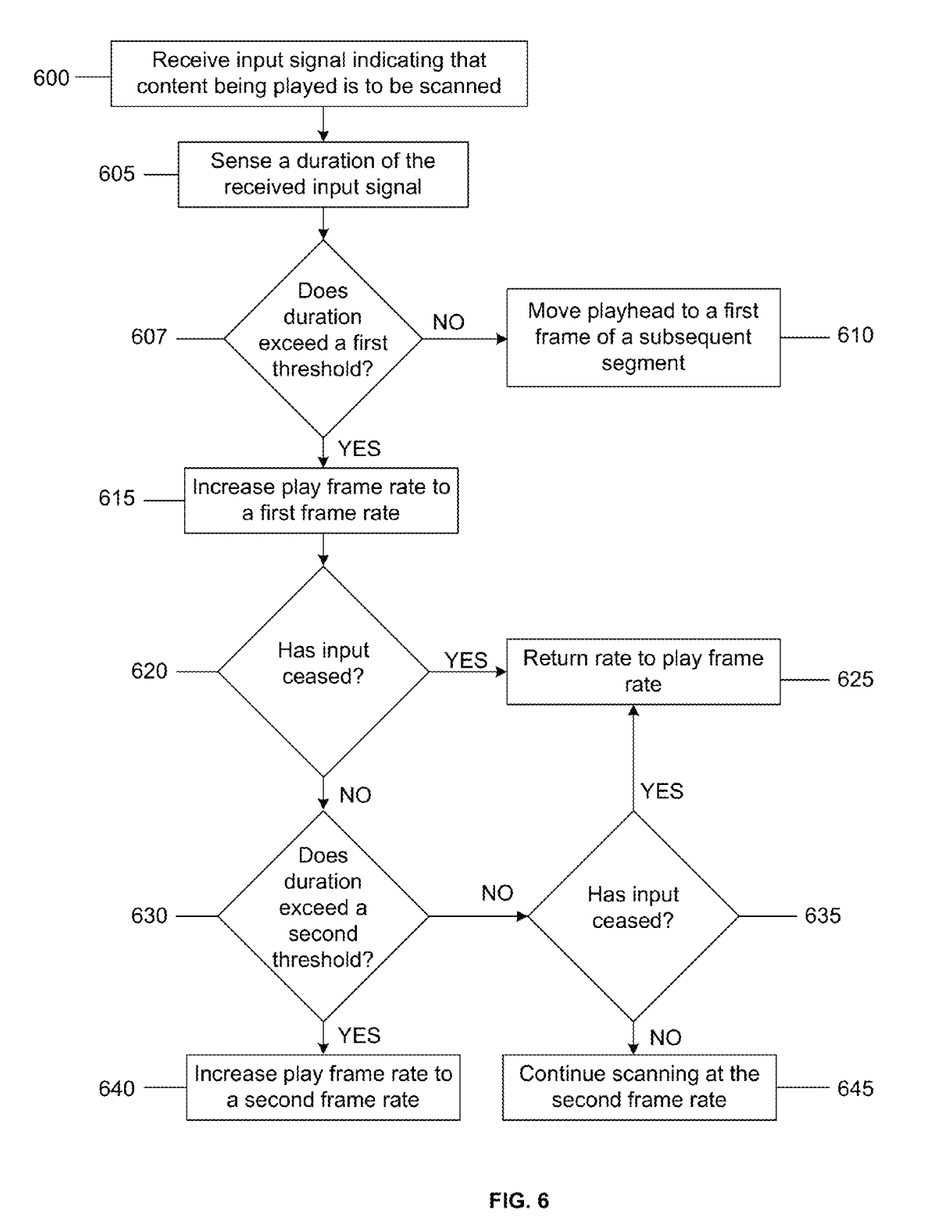
FIG. 6 is a flowchart of an example of a method of scanning content in response to an input signal.

FIG. 6 is an example of a flow chart of receiving an input signal and scanning content being played in response to the input signal. Scanning can include moving a playhead position in an accelerated manner from a current location in the content to a different location in the content. In some implementations, the input signal indicating that content being played is to be scanned is received at 600. The duration of the received input signal is sensed at 605. The duration of the received input signal is compared against a first threshold at 607. If the duration of the received input signal is less than the first threshold, the input signal is treated as a click. The content is divided into a plurality of segments based on the total duration of the content. A playhead that corresponds to a location of a frame in a segment is moved from its current location to the first frame of the subsequent segment at 610. If the duration of the received input signal exceeds the first threshold, the play frame rate is increased to a first frame rate at 615. The first frame rate is greater than the play frame rate. If the input signal is ceased (620), the frame rate is returned to the play frame rate at 625. If the input signal is continued to be received, then the duration of the input signal is compared against a second threshold at 630. If the duration of the input signal exceeds the second threshold, the play frame rate is increased to a second frame rate at 640. The second frame rate exceeds the first frame rate. The second threshold exceeds the first threshold. If the input signal is ceased (635), the frame rate is returned to the play frame rate at 625. If the input signal is continued to be received, accelerated scanning at the second frame rate is continued at 645.

A number of implementations have been described. Nevertheless, it will be understood that various modifications may be made without departing from the spirit and scope of the disclosure. For example, the operations by which forward scanning can be performed can be mirrored to scan the video content in reverse. While scanning in reverse, operations performed using the forward button 310 are performed using the rewind button 320. In this manner, the video content can be scanned in forward and in reverse at different frame rates either from the play state or the pause state.

In some implementations, the buttons on the remote control device 300 can be arranged on a wheel that can be rotated by a user using a finger. The user can skip forward in the video content by rotating the wheel. The remote control device can be configured such that the wheel rotation occurs in discrete steps. The remote control device can further be configured such that each step corresponds to an action on the state of the video content. In the play state, each step of rotation of the wheel on the remote control device may cause the video content to be scanned by a segment. A clockwise rotation may correspond to a forward scan and a counter-clockwise rotation may correspond to a reverse scan. In the pause state, each step of rotation of the wheel on the remote control device may cause the video content to scan either forward or in reverse by a pre-determined number of frames. Rotating the wheel may cause the content to scan forward at a frame rate greater than the play frame rate. When a duration for which the wheel is rotated exceeds a first threshold, the frame rate may be increased from a first frame rate to a second frame rate. Similarly, when a duration for which the wheel is rotated exceeds a second threshold, the frame rate may be increased from a second frame rate to a third frame rate.

In some implementations, the remote control device can be used to alter the play state of audio content. When playing audio content, an overlay content bar may appear on the display device. The remainder of the display device may be a blank screen. In some implementations, art related to the audio content being played may be displayed on the display device. The overlay content bar may include metadata related to the audio content. The content can include title of the audio content, total duration, expired duration, remaining duration, and the like. When the state of the audio content is altered, the display of the overlay content bar may be altered to indicate the state of the audio content. Accordingly, other implementations are within the scope of the following claims.

What is claimed is:

1. A method of scanning content comprising:
   receiving, by a processor, an input signal at substantially the same time that a first segment of digital media content is being played at a play frame rate, wherein the first segment includes a plurality of first frames, and wherein the digital media content includes a second segment comprising a plurality of second frames following the first segment;
   determining, by the processor, that a duration for which the input signal is received is less than a first threshold duration; and
   in response to the determining:
      automatically accessing, by the processor, a second frame of the plurality of second frames of the second segment, and
      automatically playing at the play frame rate, by the processor, the second segment beginning at the second frame.

2. The method of claim 1, further comprising:
   determining that the duration for which the input signal is received exceeds a first threshold; and
   in response to the determining, playing the first segment at a first frame rate greater than the play frame rate.

3. The method of claim 2, further comprising:
   determining that the duration for which the input signal is received exceeds a second threshold that is greater than the first threshold; and
   in response to the determining, playing the first segment at a second frame rate greater than the first frame rate.

4. The method of claim 3, further comprising sensing a cessation of input signal, wherein the rate is returned to the play frame rate upon sensing the cessation.

5. The method of claim 1, wherein the input signal is provided by a touch selection received in a user interface, and the duration for which the input signal is received corresponds to a duration of the touch selection.

6. The method of claim 5, wherein the user interface includes a touch screen and wherein the touch selection includes touching an icon that is displayed in the touch screen.

7. The method of claim 1, wherein the second frame is an initial frame of the plurality of second frames.

8. A non-transitory storage device storing instructions executable by a processor to perform operations for scanning content comprising:
   receiving, by a processor, an input signal at substantially the same time that a first segment of digital media content is being played at a play frame rate, wherein the first segment includes a plurality of first frames, and wherein the digital media content includes a second segment comprising a plurality of second frames following the first segment;
   determining, by the processor, that a duration for which the input signal is received is less than a first threshold duration; and
   in response to the determining:
   automatically accessing, by the processor, a second frame of the plurality of second frames of the second segment, and
      automatically playing at the play frame rate, by the processor, the second segment beginning at the second frame.

9. The device of claim 8, the operations further comprising:
   determining that the duration for which the input signal is received exceeds a first threshold; and
   in response to the determining, playing the first segment at a first frame rate greater than the play frame rate.

10. The device of claim 9, the operations further comprising:
    determining that the duration for which the input signal is received exceeds a second threshold that is greater than the first threshold; and
    in response to the determining, playing the first segment at a second frame rate greater than the first frame rate.

11. The device of claim 10, the operations further comprising sensing a cessation of input signal, wherein the rate is returned to the play frame rate upon sensing the cessation.

12. The device of claim 8, wherein the input signal is provided by a touch selection received in a user interface, and the duration for which the input signal is received corresponds to a duration of the touch selection.

13. The device of claim 12, wherein the user interface includes a touch screen and wherein the touch selection includes touching an icon that is displayed in the touch screen.

14. The device of claim 8, wherein the second frame is an initial frame of the plurality of second frames.

15. A system comprising:
a processor; and
a storage device storing instructions executable by the processor to perform operations for scanning content comprising:
receiving, by a processor, an input signal at substantially the same time that a first segment of digital media content is being played at a play frame rate, wherein the first segment includes a plurality of first frames, and wherein the digital media content includes a second segment comprising a plurality of second frames following the first segment;
determining, by the processor, that a duration for which the input signal is received is less than a first threshold duration; and in response to the determining:
automatically accessing, by the processor, a second frame of the plurality of second frames of the second segment, and
automatically playing at the play frame rate, by the processor, the second segment beginning at the second frame.

16. The system of claim 15, the operations further comprising:
determining that the duration for which the input signal is received exceeds a first threshold; and
in response to the determining, playing the first segment at a first frame rate greater than the play frame rate.

17. The system of claim 16, the operations further comprising:
determining that the duration for which the input signal is received exceeds a second threshold that is greater than the first threshold; and
in response to the determining, playing the first segment at a second frame rate greater than the first frame rate.

18. The system of claim 17, the operations further comprising sensing a cessation of input signal, wherein the rate is returned to the play frame rate upon sensing the cessation.

19. The system of claim 15, wherein the input signal is provided by a touch selection received in a user interface, and the duration for which the input signal is received corresponds to a duration of the touch selection.

20. The system of claim 15, wherein the second frame is an initial frame of the plurality of second frames.

\* \* \* \* \*